US010961403B2

(12) United States Patent
Puodziukynaite et al.

(10) Patent No.: US 10,961,403 B2
(45) Date of Patent: Mar. 30, 2021

(54) ELECTRODEPOSITABLE COATING COMPOSITIONS CONTAINING 1,1-DI-ACTIVATED VINYL COMPOUNDS

(71) Applicant: PPG Industries Ohio, Inc., Cleveland, OH (US)

(72) Inventors: Egle Puodziukynaite, Allison Park, PA (US); Craig A. Wilson, Allison Park, PA (US); David Stone, Allison Park, PA (US); James C. Serene, Lower Burrell, PA (US); Lee B. Steely, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 16/320,658

(22) PCT Filed: Jul. 26, 2017

(86) PCT No.: PCT/US2017/044010
§ 371 (c)(1),
(2) Date: Jan. 25, 2019

(87) PCT Pub. No.: WO2018/022792
PCT Pub. Date: Feb. 1, 2018

(65) Prior Publication Data
US 2019/0153244 A1 May 23, 2019

Related U.S. Application Data

(60) Provisional application No. 62/366,781, filed on Jul. 26, 2016, provisional application No. 62/419,536, filed on Nov. 9, 2016.

(51) Int. Cl.
C09D 5/44 (2006.01)
C09D 7/63 (2018.01)
C09D 163/00 (2006.01)
C09D 175/02 (2006.01)
C09D 175/04 (2006.01)

(52) U.S. Cl.
CPC ............ C09D 5/4453 (2013.01); C09D 5/44 (2013.01); C09D 5/4407 (2013.01); C09D 5/4465 (2013.01); C09D 5/4484 (2013.01); C09D 5/4488 (2013.01); C09D 7/63 (2018.01); C09D 163/00 (2013.01); C09D 175/02 (2013.01); C09D 175/04 (2013.01)

(58) Field of Classification Search
CPC ......... C09D 7/63; C09D 5/44; C09D 5/4407; C09D 5/4465; C09D 5/4484; C09D 5/4488; C09D 163/00; C09D 175/02; C09D 175/04; C09D 5/4453
USPC ...................................................... 523/402
See application file for complete search history.

(56) References Cited

U.S. PATENT DOCUMENTS

| 2,678,910 A * | 5/1954 | Brown ............. C25D 3/12 205/274 |
| 3,197,318 A | 7/1965 | Halpern et al. |
| 3,660,263 A | 5/1972 | Auletta et al. |
| 4,382,109 A | 5/1983 | Olson et al. |
| 4,452,861 A | 6/1984 | Okamoto et al. |
| 4,740,534 A | 4/1988 | Matsuda et al. |
| 4,885,191 A | 12/1989 | Podszun et al. |
| 5,321,112 A | 6/1994 | Olson |
| 5,639,828 A | 6/1997 | Briggs et al. |
| 5,723,275 A | 3/1998 | Wang et al. |
| 6,517,940 B1 | 2/2003 | Millero et al. |
| 8,609,885 B2 | 12/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,221,739 B2 | 12/2015 | Malofsky et al. |
| 9,334,430 B1 | 5/2016 | Stevenson et al. |
| 9,416,091 B1 | 8/2016 | Sullivan et al. |
| 9,567,475 B1 | 2/2017 | Palsule et al. |
| 2003/0030170 A1 | 2/2003 | Abe et al. |
| 2003/0042142 A1 | 3/2003 | Yamoto et al. |
| 2005/0171273 A1 | 8/2005 | Ledwidge et al. |
| 2014/0275419 A1 | 9/2014 | Ward et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0361283 A1 | 12/2015 | Malofsky et al. |
| 2016/0068618 A1 | 3/2016 | Sullivan et al. |
| 2018/0094115 A1 | 4/2018 | Martz et al. |
| 2019/0160739 A1 | 5/2019 | Olson et al. |
| 2019/0161620 A1 | 5/2019 | Zalich et al. |
| 2019/0161637 A1 | 5/2019 | Olson et al. |
| 2019/0161640 A1 | 5/2019 | Gottumukkala et al. |

FOREIGN PATENT DOCUMENTS

| CN | 102796909 A | 11/2012 |
| CN | 103520771 A | 1/2014 |
| CN | 104312246 | 1/2015 |
| CN | 104312246 A | 1/2015 |
| CN | 105536049 A | 5/2016 |
| CN | 105585879 | 5/2016 |
| EP | 0046088 A1 | 2/1982 |
| EP | 0327129 A1 | 8/1989 |
| EP | 0829756 A2 | 7/1999 |
| EP | 3042939 A1 | 7/2016 |

(Continued)

OTHER PUBLICATIONS

Notification of Transmittal of the International Search Report and the Written Opinion of the International Searching Authority for International Application No. PCT/US2017/044010, 14 pages, dated Jan. 2, 2018.

(Continued)

Primary Examiner — David T Karst
(74) Attorney, Agent, or Firm — K&L Gates LLP

(57) ABSTRACT

Electrodepositable coating compositions containing 1,1-di-activated vinyl compounds are described. The coating compositions produce cured coating layers that exhibit resistance to cratering. The coating compositions can be used in electrodepositable coating composition formulations.

20 Claims, No Drawings

(56) References Cited

FOREIGN PATENT DOCUMENTS

| | | |
|---|---|---|
| JP | 2008019350 | 1/2008 |
| JP | 2013100599 | 5/2013 |
| JP | 2014077024 | 5/2014 |
| KR | 20140145084 A | 12/2014 |
| WO | 0032709 A1 | 6/2000 |
| WO | 2008086033 A1 | 7/2008 |
| WO | 2013036347 A1 | 3/2013 |
| WO | 2013059473 A2 | 4/2013 |
| WO | 2013149173 A1 | 10/2013 |
| WO | 2015165808 A1 | 11/2015 |
| WO | 2017210415 A1 | 12/2017 |
| WO | 2018022804 A1 | 2/2018 |
| WO | 2018022810 A1 | 2/2018 |

OTHER PUBLICATIONS

International Search Report and Written Opinion for International Patent Application No. PCT/EP2017/044041, dated Jul. 11, 2017.

International Search Report and Written Opinion for International Patent Application No. PCT/EP2017/044041, dated Nov. 7, 2017.

International Search Report and Written Opinion for International Patent Application No. PCT/EP2017/044001, dated Oct. 30, 2017.

International Search Report and Written Opinion for International Patent Application No. PCT/EP2017/044032, dated Nov. 6, 2017.

International Search Report and Written Opinion for International Patent Application No. PCT/EP2017/044014, dated Oct. 27, 2017.

International Search Report and Written Opinion for International Patent Application No. PCT/EP2017/044005, dated Nov. 3, 2017.

Triallyl Isocyanurate TAIC Product Description, Mitsubishi International PolymerTrade Corporation, http://www.michem.com/triallyl_isocyanurate.html, 6 pages, Apr. 4, 2019.

Liu Dengliang: "Coating Process", Dec. 12, 31, p. 862, 4th Edition, Chemical Industry Press, Beijing—book not attached, 1991.

\* cited by examiner

ELECTRODEPOSITABLE COATING COMPOSITIONS CONTAINING 1,1-DI-ACTIVATED VINYL COMPOUNDS

BACKGROUND OF THE INVENTION

Electrodepositable coating compositions are film-forming compositions, typically water-based compositions, which are capable of being deposited onto an electrically-conductive substrate under the influence of an applied electrical potential. Electrodepositable coating compositions may exhibit "cratering," which refers to the formation of blind hole-like discontinuities ("craters") in the surface of electrodeposited and cured coating films. The development of craters is undesirable because craters disrupt the surface continuity and decrease the surface smoothness of electrodeposited and cured coating layers. The development of craters in electrodeposited and cured coating films can be increased by oil contamination on the surface of substrates to be electrocoated or on electrodeposited coating films prior to curing. Oil contamination may be particularly problematic in automotive applications, such as, for example, mechanized primer coating lines, where machine lubricating oils are used in relatively close proximity to coating substrates.

Various additives, such as siloxanes, acrylates, and polybutene dienes, have been formulated in electrodepositable coating compositions in an attempt to provide oil contamination-resistance and cratering-resistance. In many cases, however, such additives undesirably affect other coating properties such as adhesion. Therefore, it would be advantageous to provide electrodepositable coating compositions that exhibit improved oil contamination-resistance and cratering-resistance while maintaining other desirable coating properties.

SUMMARY OF THE INVENTION

An electrodepositable coating composition comprises: (A) a polymer comprising (1) a reactive functional group and/or (2) a salt group or a salt-forming group; and (B) at least one component comprising: (b1) a 1,1-di-activated vinyl compound, or a multifunctional form thereof, or a combination thereof; (b2) a polymerization reaction product of a 1,1-di-activated vinyl compound, or a multifunctional form thereof, or a combination thereof; and/or (b3) an addition reaction product of (1) the polymer component (A) and (2) a 1,1-di-activated vinyl compound, or a multifunctional form thereof, or a combination thereof.

A process for the production of an electrodepositable coating composition comprises: reacting (A) a polymer comprising an active hydrogen group and (B) a 1,1-di-activated vinyl compound, or a multifunctional form thereof, or a combination thereof, to form a resin product; treating the resin product with an acid to form cationic salt groups on the polymer; and dispersing the resin product in water.

An alternative process for the production of a coating composition comprises: synthesizing a polymer comprising (i) an active hydrogen group and/or (ii) a cationic salt group or an anionic salt group; dispersing the polymer in water to form a dispersion; and adding a 1,1-di-activated vinyl compound, or a multifunctional form thereof, or a combination thereof to the dispersion.

An alternative process for the production of an electrodepositable coating compositions comprises: incorporating a 1,1-di-activated vinyl compound or a reaction product thereof into the coating composition during production.

It is understood that the invention described in this specification is not necessarily limited to the examples summarized in this Summary.

DETAILED DESCRIPTION OF THE INVENTION

As used in this specification, particularly in connection with coating layers or films, the terms "on," "onto," "over," and variants thereof (e.g., "applied over," "formed over," "deposited over," "provided over," "located over," and the like), mean applied, formed, deposited, provided, or otherwise located over a surface of a substrate, but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or cross-linked state.

As used in this specification, the prefix "poly" refers to two or more. For example, a "polyfunctional" molecule (whether a polymer, monomer, or other compound) comprises two or more reactive functional groups such as hydroxyl groups, amine groups, mercapto groups, epoxide groups, and the like. More specifically, "polyol" means a compound comprising two or more hydroxyl groups, "polyamine" means a compound comprising two or more amine groups, "polythiol" means a compound comprising two or more mercapto groups, and "polyepoxide" means a compound comprising two or more epoxide groups.

A polyfunctional compound such as a polyol, polyamine, polythiol, or polyepoxide can be a polymer, but does not have to be a polymer, and can comprise, for example, non-polymeric compounds. A polymeric polyol, polymeric polyamine, polymeric polythiol, or polymeric polyepoxide respectively comprises two or more pendant and/or terminal hydroxyl, amine, mercapto, or epoxide functional groups on the polymer molecules. A "pendant group" refers to a group that comprises an offshoot from the side of a polymer backbone and which does not comprise part of the polymer backbone, whereas "terminal group" refers to a group on an end of a polymer backbone and which comprises part of the polymer backbone.

Additionally, the terms polyol, polyamine, polythiol, and polyepoxide can encompass compounds comprising combinations of different types of functional groups. For example, a compound comprising two or more hydroxyl groups and two or more epoxide groups can be referred to as a polyepoxide or a polyol/polyepoxide. Furthermore, polyol, polyamine, polythiol, and polyepoxide compounds can comprise either or both the neutral functional groups (hydroxyl, amine, mercapto, or epoxide) and/or a salt of an ionized form of the functional group (e.g., alkoxide salts, ammonium salts, and the like).

As used in this specification, the term "1,1-di-activated vinyl compound" means a compound comprising a vinyl group having two electron withdrawing groups (EWG)

covalently bonded to one of the π-bonded carbons and no substituents covalently bonded to the other π-bonded carbon (i.e., $(EWG)_2\text{-C}=CH_2$), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

The invention described in this specification generally relates to coating compositions, including electrodepositable coating compositions, comprising a 1,1-di-activated vinyl compound or a reaction product thereof. The invention described in this specification also relates to processes for producing coating compositions, including electrodepositable coating compositions, comprising a 1,1-di-activated vinyl compound or a reaction product thereof. The invention described in this specification also relates to processes for applying coating compositions, including electrodepositable coating compositions, to substrates, where the coating compositions comprise a 1,1-di-activated vinyl compound or a reaction product thereof. The invention described in this specification also relates to coating systems comprising coating compositions, including electrodepositable coating compositions, comprising a 1,1-di-activated vinyl compound or a reaction product thereof. The invention described in this specification also relates to articles comprising coating compositions, including electrodepositable coating compositions, deposited on a surface of the article, where the coating compositions comprise a 1,1-di-activated vinyl compound or a reaction product thereof.

The electrodepositable coating compositions of the present invention comprise a polymer comprising a reactive functional group and a salt group or a salt-forming group. The reactive functional group provides the polymer with a site for crosslinking the polymer using a crosslinking agent. The salt group or salt-forming group provides the polymer with ionic character that renders the polymer water-dispersible and also capable of surface deposition under the influence of an electrical potential of opposite polarity applied to an electrically-conductive substrate. Examples of polymers that are suitable for use as the reactive functional group-containing, salt (forming) group-containing polymer in the present invention include, but are not limited to, alkyd polymers, acrylic polymers, polyepoxide polymers, polyamide polymers, polyurethane polymers, polyurea polymers, polyether polymers, and polyester polymers, and combinations of any thereof, including mixtures of different polymer types (e.g., a mixture of an acrylic polymer and a polyepoxide polymer) and resins comprising polymer molecules containing combinations of different backbone functionality (e.g., polymer molecules containing both ether groups and urethane groups in the polymer backbone).

The reactive functional group can be any functional group located on or in the polymer, including pendant and/or terminal functional groups, and/or functional groups located in the polymer backbone (i.e., in-chain, e.g secondary amines), capable of reacting with a crosslinking agent to form a thermoset resin, including, for example, hydroxyl groups, mercapto (i.e., thiol) groups, amine groups, acid groups (e.g., carboxylic acid groups), or epoxide groups, or combinations of any thereof. The polymer component can comprise a pendant and/or terminal active hydrogen functional group. As used herein, the term "active hydrogen functional group" refers to those groups that are reactive with isocyanates as determined by the Zerewitnoff test as described in the Journal of the American Chemical Society, Vol. 49, page 3181 (1927). Active hydrogen functional groups include, for example, hydroxyl groups, primary or secondary amine groups, and thiol groups. The polymer component can comprise a pendant and/or terminal active hydrogen functional group in combination with a pendant and/or terminal and/or in-chain cationic salt group or anionic salt group. Alternatively, or in addition, the polymer component can comprise an in-chain functional group capable of reacting with a crosslinking agent to form a thermoset resin in combination with a pendant and/or terminal and/or in-chain cationic salt group or anionic salt group.

The salt group or salt-forming group can be any pendant and/or terminal ionic or potentially ionic group capable of being neutralized into ionic form. Alternatively, or in addition, the salt group or salt-forming group can be any ionic or potentially ionic group located in the polymer backbone (i.e., in-chain) capable of being neutralized into ionic form. The salt group or salt-forming group can be a cationic group or anionic group. Suitable anionic groups include, for example, neutralized carboxylic acid groups and phosphoric acid groups. Suitable cationic groups include, for example, sulfonium groups and ammonium groups.

The polymer component of the electrodepositable coating compositions of the present invention can comprise an active hydrogen functional group (e.g., hydroxyl, amine, and/or thiol groups) and a cationic salt group (e.g., sulfonium groups and/or ammonium groups) or an anionic salt group (e.g., carboxylic acid group and/or phosphoric acid group). Examples of suitable active hydrogen-containing, cationic salt group-containing polymers include polyepoxide-amine adducts, such as adducts of a polyglycidyl ether of a polyphenol, such as Bisphenol A, and a primary and/or secondary amine, such as those described in U.S. Pat. No. 4,031,050 at column 3, line 27 to column 5, line 50; U.S. Pat. No. 4,452,963 at column 5, line 58 to column 6, line 66; and U.S. Pat. No. 6,017,432 at column 2, line 66 to column 6, line 26, which are incorporated by reference into this specification.

A portion of the amine that is reacted with the polyepoxide to form a polyepoxide-amine adduct can be a ketimine of a polyamine, as described in U.S. Pat. No. 4,104,117 at column 6, line 23 to column 7, line 23, which is incorporated by reference into this specification. Also suitable are ungelled polyepoxide-polyoxyalkylene-polyamine resins, such as, for example, the resins described in U.S. Pat. No. 4,432,850 at column 2, line 60 to column 5, line 58, which is incorporated by reference into this specification. In addition, cationic acrylic resins can be used in the electrodepositable coating compositions of the present invention, such as the resins described in U.S. Pat. No. 3,455,806 at column 2, line 18 to column 3, line 61 and U.S. Pat. No. 3,928,157 at column 2, line 29 to column 3, line 21, which are incorporated by reference into this specification.

In addition to amine salt group-containing resins, quaternary ammonium salt group-containing resins can also be employed as a cationic salt group-containing polymer in the present invention. Examples of such resins include the resins formed by reacting an organic polyepoxide with a tertiary amine acid salt. Such resins are described in U.S. Pat. No. 3,962,165 at column 2, line 3 to column 11, line 7; U.S. Pat. No. 3,975,346 at column 1, line 62 to column 17, line 25;

and U.S. Pat. No. 4,001,156 at column 1, line 37 to column 16, line 7, which are incorporated by reference into this specification. Other suitable cationic resins include ternary sulfonium salt group-containing resins, such as those described in U.S. Pat. No. 3,793,278 at column 1, line 32 to column 5, line 20, which is incorporated by reference into this specification. Additionally, cationic resins which cure via a transesterification mechanism can be used, such as, for example, the resins described in European Patent Application No. 12463 B1 at page 2, line 1 to page 6, line 25, which is incorporated by reference into this specification.

Other suitable cationic salt group-containing resins include those that can form photodegradation resistant electrodepositable coating compositions. Such polymers include the polymers comprising cationic amine salt groups which are derived from pendant and/or terminal amino groups and are described in U.S. Patent Application Publication No. 2003/0054193 A1 at paragraphs [0064] to [0088], which is incorporated by reference into this specification. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Patent Application Publication No. US 2003/0054193 A1 at paragraphs [0096] to [0123], which is incorporated by reference into this specification.

To render the polymer dispersible in an aqueous medium, the polymer is, prior to or during dispersion in a dispersing medium comprising water, at least partially neutralized by, for example, treating with an acid to form a water-dispersible cationic salt group-containing polymer. Non-limiting examples of suitable acids include inorganic acids, such as phosphoric acid and sulfamic acid, as well as organic acids, such as acetic acid and lactic acid. In addition to acids, salts such as dimethylhydroxyethylammonium dihydrogenphosphate and ammonium dihydrogenphosphate, can be used. The polymer can be neutralized to the extent of at least 50 percent or, in some cases, at least 70 percent, of the total theoretical neutralization equivalent. The dispersion step can be accomplished by combining the neutralized or partially neutralized polymer with the water of the dispersing phase. Neutralization and dispersion can be accomplished in one step by combining the polymer, the acid or base and the water. As used herein, "water dispersible" means that a material is adapted to be solubilized, dispersed, and/or emulsified in water.

One or more active hydrogen-containing, cationic salt group-containing polymer(s) can be present in the electrodepositable coating composition in an amount of 50 to 99 percent by weight, such as 70 to 95 percent by weight, based on the total resin solids weight of the composition.

The electrodepositable coating compositions of the present invention can further include a curing agent to react with active hydrogen groups on the cationic salt group-containing polymer described above. Examples of suitable curing agents include at least partially blocked polyisocyanates, aminoplast resins, and phenolic resins, such as phenolformaldehyde condensates including allyl ether derivatives thereof.

Examples of suitable at least partially blocked polyisocyanates include aliphatic polyisocyanates, aromatic polyisocyanates, and mixtures thereof. The curing agent can comprise an at least partially blocked aliphatic polyisocyanate. Examples of suitable at least partially blocked aliphatic polyisocyanates include, for example, fully blocked aliphatic polyisocyanates, such as those described in U.S. Pat. No. 3,984,299 at column 1, line 57 to column 3, line 15, which is incorporated by reference into this specification, or partially blocked aliphatic polyisocyanates that are reacted with the polymer backbone, such as the polyisocyanates described in U.S. Pat. No. 3,947,338 at column 2, line 65 to column 4, line 30, which is incorporated by reference into this specification. As used herein, the term "blocked" means that the isocyanate groups have been reacted with a compound such that the resultant blocked isocyanate group is stable to active hydrogens at ambient temperature but reactive with active hydrogens at elevated temperatures during a curing bake, for example, at a temperature between 90° C. and 200° C. The polyisocyanate curing agent can be a fully blocked polyisocyanate and substantially free of unreacted isocyanate groups. The term "substantially free" as used in this context means the coatings compositions contain less than 1000 parts per million (ppm), "essentially free" means less than 100 ppm, and "completely free" means less than 20 parts per billion (ppb) of any of the above mentioned compounds, derivatives, or residues thereof.

The curing agent can comprise a diisocyanate, though, in other examples, higher polyisocyanates are used in lieu of or in combination with diisocyanates. Examples of aliphatic polyisocyanates suitable for use as curing agents include cycloaliphatic and araliphatic polyisocyanates such as 1,6-hexamethylene diisocyanate; isophorone diisocyanate; bis-(isocyanatocyclohexyl)methane; polymeric 1,6-hexamethylene diisocyanate; trimerized isophorone diisocyanate; norbornane diisocyanate; and mixtures of any thereof. The curing agent can comprise a fully blocked polyisocyanate selected from a polymeric 1,6-hexamethylene diisocyanate; isophorone diisocyanate; and mixtures thereof. In other examples, the polyisocyanate curing agent comprises a fully blocked trimer of hexamethylene diisocyanate available as Desmodur N3300® from Covestro LLC. Examples of suitable aromatic polyisocyanates include toluene diisocyanate (TDI) (i.e., 2,4-toluene diisocyanate, 2,6-toluene diisocyanate, or a mixture thereof); diphenylmethane-4,4-diisocyanate (MDI); naphthalene-1,5-diisocyanate (NDI); 3,3-dimethyl-4,4-biphenylene diisocyanate (TODI); m-xylene diisocyanate (XDI); and 1,4-phenylene diisocyanate; including polymers of any thereof, and mixtures of any thereof.

The polyisocyanate curing agent can be at least partially blocked with at least one blocking agent such as, for example, a 1,2-alkane diol, such as 1,2-propanediol; a 1,3-alkane diol, such as 1,3-butanediol; a benzylic alcohol, such as benzyl alcohol; an allylic alcohol, such as allyl alcohol; caprolactam; a dialkylamine, such as dibutylamine; or mixtures of any thereof. The polyisocyanate curing agent can be at least partially blocked with at least one 1,2-alkane diol having three or more carbon atoms, such as, for example, 1,2-butanediol.

The blocking agent can comprise aliphatic, cycloaliphatic, or aromatic alkyl monoalcohols or phenolic compounds, including, for example, lower aliphatic alcohols, e.g., $C_1$-$C_6$ aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines can also be used as blocking agents. Suitable glycol ethers include, for example ethylene glycol butyl ether, diethylene glycol butyl ether, ethylene glycol methyl ether, and propylene glycol methyl ether. Other suitable blocking agents include oximes, such as methyl ethyl ketoxime, acetone oxime, and cyclohexanone oxime.

Examples of aminoplast resins suitable as crosslinking agents include those described in U.S. Pat. No. 3,937,679 at column 16, line 3 to column 17, line 47, which is incorporated by reference into this specification.

The equivalent ratio of functional groups in the curing agent (e.g., isocyanate groups) to equivalents in the active hydrogen-containing cationic salt group-containing polymer (e.g., hydroxyl, amine, and/or thiol groups) can be within the range of 1:3 to 3:1. The curing agent can be present in the coating composition in an amount of 1 to 45 percent by weight, based on the total weight of resin solids in the coating composition.

The polymer component of the electrodepositable coating compositions of the present invention can comprise a polyepoxide polymer comprising an active hydrogen functional group (e.g., hydroxyl, amine, and/or thiol groups) and a cationic salt group (e.g., sulfonium groups and/or ammonium groups). Examples of such polymers are described in U.S. Patent Application Publication No. 2014/0014524 A1, which is incorporated by reference into this specification. The polymer component of the electrodepositable coating compositions of the present invention can also comprise an acrylic polymer comprising an active hydrogen functional group (e.g., hydroxyl, amine, and/or thiol groups) and a cationic salt group (e.g., sulfonium groups, ammonium groups, and/or acid-neutralized amine groups). Examples of such polymers are also described in U.S. Patent Application Publication No. 2014/0014524 A1.

The polymer component of the electrodepositable coating compositions of the present invention can comprise a polyepoxide polymer and/or an acrylic polymer comprising an active hydrogen functional group (e.g., hydroxyl, amine, and/or thiol groups) and an anionic salt group (e.g., neutralized carboxylic acid groups or neutralized phosphoric acid groups). Examples of such polymers are described in U.S. Patent Application Publication No. 2013/0306478 A1, which is incorporated by reference into this specification.

In addition to the reactive functional group-containing, salt (forming) group-containing polymer (component (A)), the electrodepositable coating compositions further comprise a 1,1-di-activated vinyl compound, or a multifunctional form thereof, or a reaction product thereof, or a combination thereof. More specifically, the electrodepositable coating compositions comprise at least one component (component (B)) comprising:
  (b1) a 1,1-di-activated vinyl compound, or a multifunctional form thereof, or a combination thereof;
  (b2) a polymerization reaction product of a 1,1-di-activated vinyl compound, or a multifunctional form thereof, or a combination thereof; and/or
  (b3) an addition reaction product of the polymer component and a 1,1-di-activated vinyl compound, or a multifunctional form thereof, or a combination thereof.

The component (B) comprising a 1,1-di-activated vinyl compound, or a multifunctional form thereof, or a reaction product thereof, or combination thereof improves the oil contamination-resistance and cratering-resistance of the electrodepositable coating compositions.

The "Addition Reaction product" refers to the adduct formed by the reaction of 1,1'-di-activated vinyl compound and/or multifunctional form thereof with a nucleophile (such as an amine, thiol or alcohol and/or their polymeric form). Without being bound to any theory, this may be the result of an addition of the nucleophile to the conjugate double bond ('the Michael Addition Reaction'), or displacing the alcohol of the ester of a 1,1-diactivated vinyl ester with a another alcohol (a trans-esterification reaction), an amine, a thiol and/or a polymeric form of them. For example, the reaction of an amine can result in an amide product and the reaction with a thiol can result in a thioester product. A "polymeric addition product" refers to the product of polymerization reaction, wherein a multitude of reactants react repetitively. Without being bound by any theory, this could be done through a variety of reaction mechanisms, such as anionic polymerization, condensation polymerization, chain growth or radical polymerization. For example, a primary amine can react 1,1'-diethyl methylene malonate (DEMM) via anionic polymerization to form polymeric-DEMM.

The 1,1-di-activated vinyl compounds can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used in the electrodepositable coating compositions are described in U.S. Pat. Nos. 8,609,885; 8,884,051; 9,108, 914; 9,181,365; and 9,221,739, which are incorporated by reference into this specification. Additional examples of 1,1-di-activated vinyl compounds and multifunctional forms thereof that can be used in the electrodepositable coating compositions are described in U.S. Publication Nos. 2014/0288230; 2014/0329980; and 2016/0068618, which are incorporated by reference into this specification.

The electrodepositable coating compositions can comprise a 1,1-di-activated vinyl compound comprising a methylene malonate. Methylene malonates are compounds having the general formula (I):

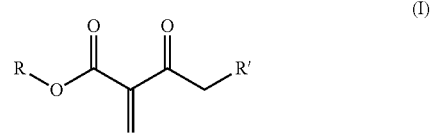

(I)

wherein R and R' can be the same or different and can represent nearly any substituent or side-chain, such as substituted or unsubstituted alkyl or aryl groups. For example, the electrodepositable coating compositions can comprise a dialkyl methylene malonate, a diaryl methylene malonate, a multifunctional form of a dialkyl methylene malonate, or a multifunctional form of a diaryl methylene malonate, or a combination of any thereof.

A multifunctional form of a methylene malonate can comprise a transesterification adduct of the methylene malonate and a polyol. A multifunctional form of a methylene malonate can thus have the general formula (II):

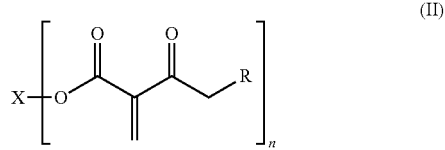

(II)

wherein X is a polyol residue and each R can be the same or different, as described above As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound. In some examples, a multifunctional form of a methylene malonate can comprise a transesterification adduct of the methylene malonate and a diol, and thus have the general formula (III):

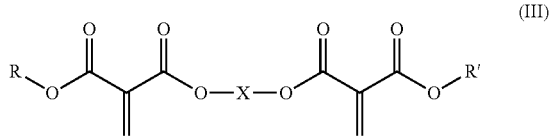

wherein X is a diol residue and R and R' can be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). Examples of transesterification adducts of methylene malonates and polyols that can be used in the electrodepositable coating compositions are described in U.S. Publication No. 2014/0329980 and U.S. Pat. No. 9,416,091, which are incorporated by reference herein.

The electrodepositable coating compositions can comprise dimethyl methylene malonate (D3M), a multifunctional form of D3M, or both. The electrodepositable coating compositions can comprise diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol.

The electrodepositable coating compositions can comprise a combination of a dialkyl methylene malonate and a multifunctional form of a dialkyl methylene malonate. The electrodepositable coating compositions can comprise, for example, DEMM and a multifunctional form of DEMM comprising a transesterification adduct of DEMM and at least one polyol. The DEMM can be transesterified with polyol comprising, for example, an alkane diol such as 1,5-pentanediol or 1,6-hexanediol.

The 1,1-di-activated vinyl compound, or multifunctional form thereof, or combination thereof can be added to the electrodepositable coating compositions during the resin synthesis stage, the resin dispersion stage, or the coating formulation stage. Generally speaking, electrodepositable coating compositions are produced in three stages. During the resin synthesis stage, the film-forming polymer component of the resin is synthesized from precursors such as oligomers, monomers, chain extenders, blocked cross-linkers, and functionalizing compounds. During the resin dispersion stage, the polymer produced during the resin synthesis stage is neutralized (ionized), if not in ionic form after the completion of synthesis, and dispersed in an aqueous-based medium. During the coating formulation stage, the resin dispersion produced during the resin dispersion stage, is formulated with additional components such as pigments, cure catalysts, and the like, and diluted to the desired solids content for electrodeposition into substrates.

While not intending to be bound by any theory, it is believed that the vinyl group(s) in the 1,1-di-activated vinyl compounds and/or the multifunctional forms thereof can react via a Michael addition mechanism with hydroxyl, amine, and/or thiol groups on or in the film-forming polymer component of the electrodepositable coating compositions when the 1,1-di-activated vinyl compounds and/or the multifunctional forms thereof are added during the resin synthesis stage, and possibly when added during the resin dispersion stage or the coating formulation stage. Additionally, the 1,1-di-activated vinyl compounds and/or the multifunctional forms thereof can undergo self-polymerization reactions, thereby forming polymers, when added during the resin synthesis stage, and possibly when added during the resin dispersion stage, or the coating formulation stage. Furthermore, the resulting polymers of the 1,1-di-activated vinyl compounds and/or the multifunctional forms thereof may covalently bond to the polymer component of the electrodepositable coating compositions through linkages formed by Michael addition reactions with hydroxyl, amine, and/or thiol groups on or in the polymer component. Therefore, it is believed that the electrodepositable coating compositions with added 1,1-di-activated vinyl compound and/or a multifunctional form thereof, regardless of the stage at which the addition is made, include a component (B) comprising:

(b1) a 1,1-di-activated vinyl compound, or a multifunctional form thereof, or a combination thereof (unreacted); or (b2) a polymerization reaction product of a 1,1-di-activated vinyl compound, or a multifunctional form thereof, or a combination thereof; or (b3) an addition reaction product of the polymer component and a 1,1-di-activated vinyl compound, or a multifunctional form thereof, or a combination thereof; or a combination of any of (b1) and/or (b2) and/or (b3).

The electrodepositable coating compositions can include 0.1-30 percent by weight of the component (b1) and/or (b2), based on total weight of resin solids in the coating composition, or any sub-range subsumed therein, such as, for example, 1-25%, 1-20%, 1-15%, or 1-10%. The component (B) can comprise (b1) the 1,1-di-activated vinyl compound and/or the multifunctional form thereof in an unreacted state. Alternatively, or additionally, the component (B) can comprise (b2) a polymerization reaction product of the 1,1-di-activated vinyl compound and/or the multifunctional form thereof. For example, the component (B) can comprise the polymerization reaction product (b2) of reactants comprising a dialkyl methylene malonate and/or a multifunctional form of the dialkyl methylene malonate comprising a transesterification adduct of the dialkyl methylene malonate and at least one polyol. Alternatively, or additionally, the component (B) can comprise (b3) an addition reaction product of the polymer component (A) and the 1,1-di-activated vinyl compound and/or the multifunctional form thereof. For example, the component (B) can comprise the addition reaction product (b3) of reactants comprising (i) the polymer component (A) and a dialkyl methylene malonate and/or a multifunctional form of the dialkyl methylene malonate comprising a transesterification adduct of the dialkyl methylene malonate and at least one polyol.

As described above, the polymer component (A) can comprise, among other combinations of polymer type and pendant/terminal functionality, an amine-functional polyepoxide polymer (e.g., a polyepoxide-amine adduct), an amine-functional polyacrylate polymer, an amine-functional polyurethane and/or polyurea polymer, an amine-functional polyester polymer, an amine-functional polyether polymer, an acid-functional polyepoxide polymer, an acid-functional polyacrylate polymer, an acid-functional polyurethane and/or polyurea polymer, an acid-functional polyester polymer, an acid-functional polyether polymer, a sulfonium-functional polyepoxide polymer, a sulfonium-functional polyacrylate polymer, a sulfonium-functional polyurethane and/or polyurea polymer, a sulfonium-functional polyester polymer, or a sulfonium-functional polyether polymer, or a combination of any thereof. As described above, these polymers can be charged by neutralizing the functional groups with acid (to make cationic functionality) or base (to make anionic functionality).

The electrodepositable coating compositions can further comprise a curing catalyst, which can be used to catalyze the reaction between a curing agent and the reactive functional groups of the film forming polymer component (A) described above. Suitable curing catalysts that can be used as in the electrodepositable coating compositions include, for example, organotin compounds (e.g., dibutyltin oxide or dioctyltin oxide) and salts thereof (e.g., dibutyltin diacetate); other metal oxides (e.g., oxides of cerium, zirconium, and/or bismuth) and salts thereof (e.g., bismuth sulfamate and/or bismuth lactate), a cyclic guanidine (as described in U.S. Pat. No. 7,842,762 at column 1, line 53 to column 4, line 18, and column 16, line 62 to column 19, line 8, which is incorporated by reference into this specification), zinc, or combinations of any thereof.

The electrodepositable coating compositions described in this specification can comprise colorants and/or other optional materials, which are known in the art of formulated surface coatings. As used herein, the term "colorant" means any substance that imparts color and/or other opacity and/or other visual effect to the composition. A colorant can be added to the electrodepositable coating composition in any suitable form, such as discrete particles, dispersions, solutions, pastes, and/or flakes (e.g., aluminum flakes). A single colorant or a mixture of two or more colorants can be used in the electrodepositable coating compositions.

Example colorants include pigments, dyes, and tints, such as those used in the paint industry and/or listed in the Dry Color Manufacturers Association (DCMA), as well as special effect compositions. A colorant can include, for example, a finely divided solid powder that is insoluble but wettable under the conditions of use. A colorant can be organic or inorganic and can be agglomerated or non-agglomerated. Colorants can be incorporated into the electrodepositable coating compositions by use of a grind vehicle, such as an acrylic grind vehicle, the use of which will be familiar to persons skilled in the art.

Example pigments and/or pigment compositions include, for example, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and combinations of any thereof.

In general, a colorant can be present in any amount sufficient to impart a desired visual and/or color effect. A colorant can comprise from 1 to 65 weight percent of the present compositions, such as from 3 to 40 weight percent or 5 to 35 weight percent, with weight percent based on the total weight of the electrodepositable coating compositions.

The electrodepositable coating compositions can comprise other optional materials known in the art of formulated surface coatings, such as plasticizers, anti-oxidants, hindered amine light stabilizers, UV light absorbers and stabilizers, surfactants, flow control agents, thixotropic agents such as bentonite clay, rheology modifiers, pigments, fillers, organic cosolvents, catalysts, including phosphonic acids, and other customary auxiliaries.

In addition to the electrodepositable coating compositions described in this specification, the present invention includes a process for the production of an electrodepositable coating composition. In one example, the process can comprise reacting (A) a polymer comprising an active hydrogen group and (B) a 1,1-di-activated vinyl compound, or a multifunctional form thereof, or a combination thereof, to form a resin product. For example, component (B) can reacted during the synthesis of component (A). The resin product can be treated with an acid or a base to form cationic salt groups or anionic salt groups on the polymer, and the resin product can be dispersed in water. The resin product may comprise a polymerization reaction product of component (B) and/or an addition reaction product of components (A) and (B), as described above. The polymer component (A) can comprise any of the combinations of polymer types and reactive functional groups described above, such as, for example, an amine-functional polyepoxide polymer (e.g., a polyepoxide-amine adduct) or an amine-functional acrylic polymer. The component (B) can comprise a reacted or unreacted 1,1-di-activated vinyl compound comprising dimethyl methylene malonate and/or diethyl methylene malonate, and/or a multifunctional form of any thereof. For example, the component (B) can comprise reacted or unreacted diethyl methylene malonate, and/or a multifunctional form of diethyl methylene malonate comprising a transesterification adduct of diethyl methylene malonate and at least one polyol, as described above.

In another example, a process for the production of an electrodepositable coating composition comprises synthesizing a polymer comprising an active hydrogen group and a cationic salt group, an anionic salt group, or a functional group capable of being neutralized with an acid or a base to form a cationic salt group or an anionic salt group. The polymer is dispersed in water to form a dispersion. A 1,1-di-activated vinyl compound, or a multifunctional form thereof, or a combination thereof, is added to the dispersion. The 1,1-di-activated vinyl compound, or a multifunctional form thereof, or a combination thereof, can be added to the dispersion in an amount of 0.1-30 percent by weight, based on total weight of resin solids in the dispersion, or any sub-range subsumed therein, such as, for example, 1-15%.

The 1,1-di-activated vinyl compound, or a multifunctional form thereof, or a combination thereof, may polymerize in the dispersion. For example, Component (B) can reacted during the dispersion of the resin product. The 1,1-di-activated vinyl compound, or a multifunctional form thereof, or a combination thereof, may react with functional groups on or in the polymer to form pendant and/or terminal groups derived from the addition of the 1,1-di-activated vinyl compound, or a multifunctional form thereof, or a combination thereof. The 1,1-di-activated vinyl compound, or a multifunctional form thereof, or a combination thereof, may react with pendant and/or terminal active hydrogen groups on the polymer to form pendant and/or terminal groups derived from the addition of the 1,1-di-activated vinyl compound, or a multifunctional form thereof, or a combination thereof. The 1,1-di-activated vinyl compound, or a multifunctional form thereof, or a combination thereof, may remain unreacted in the dispersion. The 1,1-di-activated vinyl compound, whether reacted or unreacted in the dispersion, can comprise dimethyl methylene malonate and/or diethyl methylene malonate and/or a multifunctional form of any thereof. For example, the 1,1-di-activated vinyl compound can comprise reacted or unreacted diethyl methylene malonate and/or a multifunctional form of diethyl methylene malonate comprising a transesterification adduct of diethyl methylene malonate and at least one polyol, as described above. The polymer component can comprise any of the combinations of polymer types and reactive functional groups described above, such as, for example, an amine-functional polyepoxide polymer (e.g., a polyepoxide-amine adduct) or an amine-functional acrylic polymer.

The electrodepositable coating composition described in this specification can be applied alone or as part of a coating system that can be deposited onto a number of different substrates and articles. A coating system typically comprises a number of coating layers. A coating layer is typically formed when a coating composition that is deposited onto a substrate is substantially dried and/or cured by methods known in the art (e.g., by thermal heating during a baking operation). As used in this specification, the terms "cure" and "curing" refer to the chemical crosslinking of components in a coating composition applied as a coating layer over a substrate. Accordingly, the terms "cure" and "curing" do not encompass solely physical drying of coating compositions through solvent or carrier evaporation. In this regard, the term "cured," as used in this specification, refers to the condition of a coating layer in which at least one of the components of the coating composition forming the layer has chemically reacted to form new covalent bonds in the coating layer.

Suitable substrates that can be coated with the electrodepositable coating compositions described in this specification include, for example, metal substrates, metal alloy substrates, and/or substrates that have been metalized, such as nickel plated plastic. The metal or metal alloy can be aluminum and/or steel. For example, a steel substrate could be cold rolled steel, electrogalvanized steel, or hot dipped galvanized steel. Moreover, the substrate can comprise a portion of a vehicle such as a vehicular body (e.g., door panel, body panel, trunk deck lid, roof panel, hood, and/or roof) and/or a vehicular frame. As used herein, the term "vehicle" and variations thereof includes, but is not limited to, civilian, commercial, and military land, aerospace, and marine vehicles such as cars, vans, motorcycles, trucks, airplanes, helicopters, boats, and submersibles. It will also be understood that, in some implementations, a substrate or article to be electrocoated can be pretreated with a pretreatment solution, such as a zinc phosphate solution as described in U.S. Pat. Nos. 4,793,867 and 5,588,989, or a zirconium-containing solution, such as described in U.S. patent application Ser. Nos. 11/610,073 and 11/833,525. Alternatively, in other implementations, a substrate or article to be electrocoated is not pretreated with a pretreatment solution prior to coating the substrate with the electrodepositable coating composition described in this specification.

The present invention therefore includes an article comprising a coating layer electrodeposited over a surface of the article, wherein the coating layer comprises the electrodepositable coating compositions described in this specification. For example, the article can comprise a mobile entity or other free-standing structure.

After the electrodepositable coating composition of the present invention is applied and cured to form a coating layer, a primer-surfacer coating composition can be applied onto at least a portion of the electrocoated layer. A primer-surfacer coating composition can be applied to the electrocoated layer and cured before a subsequent coating composition is applied over the primer-surfacer coating layer. A primer-surfacer coating layer that results from a primer-surfacer coating composition serves to enhance chip resistance of coatings system as well as aid in the appearance of subsequently applied coating layers (e.g., color imparting coating compositions and/or substantially clear coating composition). As used in this specification, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc. as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. Pat. No. 7,868,085. A primer-surfacer coating composition can be optional and therefore not used in some coating systems. Therefore, a color imparting coating composition can be applied directly onto the cured electrocoated layer.

A color imparting coating composition (i.e., a "basecoat") can be deposited onto at least a portion of a primer surfacer coating layer (if present) or directly onto an electrocoated layer. Any basecoat coating composition known in the art can be used in the present invention. It is noted that these basecoat coating compositions typically comprise a colorant.

A substantially clear coating composition (i.e., a "clearcoat") is deposited onto at least a portion of a basecoat coating layer. As used herein, a "substantially clear" coating layer is substantially transparent and not opaque. A substantially clear coating composition can comprise a colorant but not in an amount such as to render the clear coating composition opaque (not substantially transparent) after it has been cured. Any clearcoat coating composition known in the art can be used in the present invention. For example, the clearcoating compositions described in U.S. Pat. Nos. 5,989, 642, 6,245,855, 6,387,519, and 7,005,472 can be used in coating systems. A clearcoating composition can also comprise a particle, such as a silica particle, that is dispersed in the clearcoat coating composition (such as at the surface of the clearcoat coating composition after curing).

WORKING EXAMPLES

The following working examples are intended to further describe the invention. It is understood that the invention described in this specification is not necessarily limited to the examples described in this section.

Example 1: Preparation of a Blocked Polyisocyanate Crosslinker for Electrodepositable Coating Compositions (Crosslinker I)

A blocked polyisocyanate crosslinker (Crosslinker I), suitable for use in electrodepositable coating resins, was prepared in the following manner. Components 2-5 listed in Table 1, below, were mixed in a flask set up for total reflux with stirring under nitrogen. The mixture was heated to a temperature of 35° C., and Component 1 was added dropwise so that the temperature increased due to the reaction exotherm and was maintained under 100° C. After the addition of Component 1 was complete, a temperature of 110° C. was established in the reaction mixture and the reaction mixture held at temperature until no residual isocyanate was detected by IR spectroscopy. Component 6 was then added and the reaction mixture was allowed to stir for 30 minutes and cooled to ambient temperature.

TABLE 1

| No. | Component | Parts-by-weight (grams) |
|---|---|---|
| 1 | Polymeric methylene diphenyl diisocyanate[1] | 1340.00 |
| 2 | Dibutyltin dilaurate | 2.61 |
| 3 | Methyl isobutyl ketone | 200.00 |
| 4 | Diethylene glycol monobutyl ether | 324.46 |
| 5 | Ethylene glycol monobutyl ether | 945.44 |
| 6 | Methyl isobutyl ketone | 88.60 |

[1]Rubinate M, available from Huntsman Corporation.

Example 2: Preparation of a Blocked Polyisocyanate Crosslinker for Electrodepositable Coating Compositions (Crosslinker II)

A blocked polyisocyanate crosslinker (Crosslinker II), suitable for use in electrodepositable coating resins, was prepared in the following manner. Components 1-5 listed in Table 2, below, were mixed in a flask set up for total reflux with stirring under nitrogen. The mixture was heated to a temperature of 35° C., and Component 6 was added dropwise so that the temperature increased due to the reaction exotherm and was maintained under 100° C. After the addition of Component 6 was complete, Component 7 was added and the reaction mixture was held for 60 minutes and then cooled to ambient temperature. After the hold, no residual isocyanate was detected by IR spectroscopy.

TABLE 2

| No. | Component | Parts-by-weight (grams) |
|---|---|---|
| 1 | Ethylene glycol monobutyl ether | 186.44 |
| 2 | Bisphenol A - ethylene oxide adduct (1/6 molar ratio BPA/EtO) | 194.34 |
| 3 | Methanol | 176.96 |
| 4 | Dibutyltin dilaurate | 0.81 |
| 5 | Methyl isobutyl ketone | 179.68 |
| 6 | Polymeric methylene diphenyl diisocyanate[1] | 1058.60 |
| 7 | Methyl isobutyl ketone | 128.35 |

[1]Rubinate M, available from Huntsman Corporation.

Example 3: Preparation of a Cationic, Amine-Functionalized, Polyepoxide-Based Resin Comprising 1,1-Di-Activated Vinyl Compound Added During Resin Synthesis (Inventive Resin Dispersion A)

A cationic, amine-functionalized, polyepoxide-based polymeric resin, suitable for use in formulating electrodepositable coating compositions, was prepared in the following manner. Components 1-5 listed in Table 3, below, were mixed in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour. After the hold, a temperature of 100° C. was established in the reaction mixture and Component 11 was added dropwise to the reaction mixture and then allowed to react for 1 hour, resulting in Resin Synthesis Product A.

TABLE 3

| No. | Component | Parts-by-weight (grams) |
|---|---|---|
| | Resin Synthesis Stage | |
| 1 | Bisphenol A diglycidyl ether[1] | 122.94 |
| 2 | Bisphenol A | 53.08 |
| 3 | Bisphenol A - ethylene oxide adduct (1/6 molar ratio BPA/EtO) | 25.00 |
| 4 | Methyl isobutyl ketone (MIBK) | 6.22 |
| 5 | Ethyl triphenyl phosphonium iodide | 0.12 |
| 6 | Bisphenol A - ethylene oxide adduct (1/6 molar ratio BPA/EtO) | 25.00 |
| 7 | Methyl isobutyl ketone | 24.47 |
| 8 | Crosslinker I[2] | 143.93 |
| 9 | Diethylene triamine - MIBK diketimine[3] | 11.40 |
| 10 | Methyl ethanol amine | 9.74 |
| 11 | Diethyl methylene malonate (DEMM) | 18.80 |
| | Resin Dispersion Stage | |
| 12 | Resin Synthesis Product A | 379.01 |
| 13 | Sulfamic acid | 7.74 |
| 14 | Deionized water | 233.39 |
| 15 | Gum rosin solution in butyl carbitol formal (30 wt %) | 3.32 |
| 16 | Deionized water | 278.91 |

[1]EPON 828, available from Hexion Corporation.
[2]See Example 1, above.
[3]72.7% by weight (in MIBK) of the diketimine reaction product of 1 equivalent of diethylene triamine and 2 equivalents of MIBK.

A portion of the Resin Synthesis Product A (Component 12) was then poured into a pre-mixed solution of Components 13 and 14 to form a resin dispersion. Component 15 was then added quickly and the resin dispersion was stirred for 1 hour. Component 16 was then added to further dilute the resin dispersion. The free MIBK in the resin dispersion was removed from the dispersion under vacuum at a temperature of 60-70° C.

The solids content of the resulting cationic, amine-functionalized, polyepoxide-based polymeric resin dispersion, comprising 1,1-di-activated vinyl compound (DEMM) added during the resin synthesis stage (Inventive Resin Dispersion A), was determined by adding a quantity of the resin dispersion to a tared aluminum dish, recording the initial weight of the resin dispersion, heating the resin dispersion in the dish for 60 minutes at 110° C. in an oven, allowing the dish to cool to ambient temperature, reweighing the dish to determine the amount of non-volatile content remaining, and calculating the solids content by dividing the weight of the remaining non-volatile content by the initial resin dispersion weight and multiplying by 100. (Note, this procedure was used to determine the solids content in each of resin dispersion examples described below). The Inventive Resin Dispersion A had a solids content of 39.39% by weight. The residual unreacted DEMM content in the Inventive Resin Dispersion A was <0.01% by total dispersion weight, as estimated by gas chromatography.

Example 4: Preparation of a Cationic, Amine-Functionalized, Polyepoxide-Based Resin Comprising 1,1-Di-Activated Vinyl Compound Added During Resin Synthesis (Inventive Resin Dispersion B)

A cationic, amine-functionalized, polyepoxide-based polymeric resin, suitable for use in formulating electrodepositable coating compositions, was prepared in the following manner. Components 1-5 listed in Table 4, below, were mixed in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour. After the hold, a temperature of 100° C. was established in the reaction mixture and Component 11 was added dropwise to the reaction mixture and then allowed to react for 1 hour, resulting in Resin Synthesis Product B.

TABLE 4

| No. | Component | Parts-by-weight (grams) |
|---|---|---|
| | Resin Synthesis Stage | |
| 1 | Bisphenol A diglycidyl ether[1] | 122.94 |
| 2 | Bisphenol A | 53.08 |
| 3 | Bisphenol A - ethylene oxide adduct (1/6 molar ratio BPA/EtO) | 25.00 |
| 4 | Methyl isobutyl ketone (MIBK) | 6.22 |
| 5 | Ethyl triphenyl phosphonium iodide | 0.12 |
| 6 | Bisphenol A - ethylene oxide adduct (1/6 molar ratio BPA/EtO) | 25.00 |
| 7 | Methyl isobutyl ketone | 24.47 |
| 8 | Crosslinker I[2] | 143.93 |
| 9 | Diethylene triamine - MIBK diketimine[3] | 11.40 |
| 10 | Methyl ethanol amine | 9.74 |
| | Resin Dispersion Stage | |
| 11 | Dimethyl methylene malonate (D3M) | 18.80 |
| 12 | Resin Synthesis Product B | 379.01 |
| 13 | Sulfamic acid | 7.74 |
| 14 | Deionized water | 233.39 |
| 15 | Gum rosin solution in butyl carbitol formal (30 wt %) | 3.32 |
| 16 | Deionized water | 278.91 |

[1]EPON 828, available from Hexion Corporation.
[2]See Example 1, above.
[3]72.7% by weight (in MIBK) of the diketimine reaction product of 1 equivalent of diethylene triamine and 2 equivalents of MIBK.

A portion of the Resin Synthesis Product B (Component 12) was then poured into a pre-mixed solution of Components 13 and 14 to form a resin dispersion. Component 15 was then added quickly and the resin dispersion was stirred for 1 hour. Component 16 was then added to further dilute the resin dispersion. The free MIBK in the resin dispersion was removed from the dispersion under vacuum at a temperature of 60-70° C.

The solids content of the resulting cationic, amine-functionalized, polyepoxide-based polymeric resin dispersion, comprising 1,1-di-activated vinyl compound (D3M) added during the resin synthesis stage (Inventive Resin Dispersion B), was determined as described above in Example 3. The Inventive Resin Dispersion B had a solids content of 38.16% by weight. The residual unreacted D3M content in the Inventive Resin Dispersion B was <0.01% by total dispersion weight, as estimated by gas chromatography.

Example 5: Preparation of a Cationic, Amine-Functionalized, Polyepoxide-Based Resin Comprising 1,1-Di-Activated Vinyl Compound Added During Resin Synthesis (Inventive Resin C)

A cationic, amine-functionalized, polyepoxide-based polymeric resin, suitable for use in formulating electrodepositable coating compositions, was prepared in the following manner. Components 1-5 listed in Table 5, below, were mixed in a flask set up for total reflux with stirring under nitrogen. The mixture was heated to a temperature of 130° C. and allowed to exotherm (175° C. maximum). A temperature of 146° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour. After the hold, a temperature of 100° C. was established in the reaction mixture and Components 11 and 12 were added dropwise to the reaction mixture and then allowed to react for 1 hour, resulting in Resin Synthesis Product C.

TABLE 5

| No. | Component | Parts-by-weight (grams) |
|---|---|---|
| | Resin Synthesis Stage | |
| 1 | Bisphenol A diglycidyl ether[1] | 122.94 |
| 2 | Bisphenol A | 53.08 |
| 3 | Bisphenol A - ethylene oxide adduct (1/6 molar ratio BPA/EtO) | 24.94 |
| 4 | Methyl isobutyl ketone (MIBK) | 6.22 |
| 5 | Ethyl triphenyl phosphonium iodide | 0.12 |
| 6 | Bisphenol A - ethylene oxide adduct (1/6 molar ratio BPA/EtO) | 33.20 |
| 7 | Methyl isobutyl ketone | 18.95 |
| 8 | Crosslinker II[2] | 215.16 |
| 9 | Diethylene triamine - MIBK diketimine[3] | 5.29 |
| 10 | Methyl ethanol amine | 9.54 |
| 11 | Diethyl methylene malonate (DEMM) | 6.95 |
| 12 | DEMM-hexanediol adduct[4] | 1.74 |
| | Resin Dispersion Stage | |
| 13 | Resin Synthesis Product C | 428.40 |
| 14 | Sulfamic acid | 7.38 |
| 15 | Deionized water | 244.97 |
| 16 | Gum rosin solution in butyl carbitol formal (30 wt %) | 3.74 |
| 17 | Butyl carbitol formal | 2.62 |
| 18 | Deionized water | 2.00 |
| 19 | Deionized water | 219.30 |

[1]EPON 828, available from Hexion Corporation.
[2]See Example 2, above.
[3]72.7% by weight (in MIBK) of the diketimine reaction product of 1 equivalent of diethylene triamine and 2 equivalents of MIBK.
[4]A mixture of diethyl methylene malonate and a transesterification adduct of diethyl methylene malonate and 1,6-hexanediol, as described in U.S. Publication No. 2014/0329980.

A portion of the Resin Synthesis Product C (Component 13) was then poured into a pre-mixed solution of Components 14 and 15 to form a resin dispersion. Components 16-18 were then added quickly and the resin dispersion was stirred for 1 hour. Component 19 was then added to further dilute the resin dispersion. The free MIBK in the resin dispersion was removed from the dispersion under vacuum at a temperature of 60-70° C.

The solids content of the resulting cationic, amine-functionalized, polyepoxide-based polymeric resin dispersion, comprising 1,1-di-activated vinyl compound (DEMM and DEMM-hexanediol adduct) added during the resin synthesis stage (Inventive Resin Dispersion C), was determined as described above in Example 3. The Inventive Resin Dispersion C had a solids content of 42.60% by weight. The residual unreacted DEMM content in the Inventive Resin Dispersion C was <0.01% by total dispersion weight, as estimated by gas chromatography.

Example 6: Preparation of a Cationic, Amine-Functionalized, Polyepoxide-Based Resin Comprising 1,1-Di-Activated Vinyl Compound Added During Resin Dispersion (Inventive Resin D)

A cationic, amine-functionalized, polyepoxide-based polymeric resin, suitable for use in formulating electrodepositable coating compositions, was prepared in the following manner. Components 1-5 listed in Table 6, below, were mixed in a flask set up for total reflux with stirring under nitrogen. The mixture was heated to a temperature of 130° C. and allowed to exotherm (175° C. maximum). A temperature of 146° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour, resulting in Resin Synthesis Product D.

TABLE 6

| No. | Component | Parts-by-weight (grams) |
|---|---|---|
| | Resin Synthesis Stage | |
| 1 | Bisphenol A diglycidyl ether [1] | 122.94 |
| 2 | Bisphenol A | 53.08 |
| 3 | Bisphenol A—ethylene oxide adduct (1/6 molar ratio BPA/EtO) | 24.94 |
| 4 | Methyl isobutyl ketone (MIBK) | 6.22 |
| 5 | Ethyl triphenyl phosphonium iodide | 0.12 |
| 6 | Bisphenol A—ethylene oxide adduct (1/6 molar ratio BPA/EtO) | 33.20 |
| 7 | Methyl isobutyl ketone | 18.95 |
| 8 | Crosslinker II [2] | 215.16 |
| 9 | Diethylene triamine—MIBK diketimine [3] | 5.29 |
| 10 | Methyl ethanol amine | 9.54 |
| | Resin Dispersion Stage | |
| 11 | Resin Synthesis Product D | 420.92 |
| 12 | Sulfamic acid | 7.38 |
| 13 | Deionized water | 239.10 |
| 14 | Gum rosin solution in butyl carbitol formal (30 wt %) | 3.66 |
| 15 | Butyl carbitol formal | 2.56 |
| 16 | Deionized water | 2.00 |
| 17 | Diethyl methylene malonate (DEMM) | 7.47 |
| 18 | Deionized water | 222.51 |

[1] EPON 828, available from Hexion Corporation.
[2] See Example 2, above.
[3] 72.7% by weight (in MIBK) of the diketimine reaction product of 1 equivalent of diethylene triamine and 2 equivalents of MIBK.

A portion of the Resin Synthesis Product D (Component 11) was then poured into a pre-mixed solution of Components 12 and 13 to form a resin dispersion. Components 14-16 were then added quickly and the resin dispersion. Component 17 was then added dropwise to the resin dispersion and the resin dispersion was stirred for 1 hour. Component 18 was then added to further dilute the resin dispersion. The free MIBK in the resin dispersion was removed from the dispersion under vacuum at a temperature of 60-70° C.

The solids content of the resulting cationic, amine-functionalized, polyepoxide-based polymeric resin dispersion, comprising 1,1-di-activated vinyl compound (DEMM) added during the resin dispersion stage (Inventive Resin Dispersion D), was determined as described above in Example 3. The Inventive Resin Dispersion D had a solids content of 45.93% by weight. The residual unreacted DEMM content in the Inventive Resin Dispersion D was 0.25% by total dispersion weight, as estimated by gas chromatography.

Example 7: Preparation of a Cationic, Amine-Functionalized, Polyepoxide-Based Resin without any 1,1-Di-Activated Vinyl Compound in the Resin or Dispersion (Comparative Resin Dispersion E)

A cationic, amine-functionalized, polyepoxide-based polymeric resin, suitable for use in formulating electrodepositable coating compositions, was prepared in the following manner. Components 1-5 listed in Table 7, below, were mixed in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 122° C. was established in the reaction mixture and the reaction mixture held for 2 hours, resulting in Resin Synthesis Product E.

TABLE 7

| No. | Component | Parts-by-weight (grams) |
|---|---|---|
| | Resin Synthesis Stage | |
| 1 | Bisphenol A diglycidyl ether[1] | 583.94 |
| 2 | Bisphenol A | 252.15 |
| 3 | Bisphenol A - ethylene oxide adduct (1/6 molar ratio BPA/EtO) | 118.75 |
| 4 | Methyl isobutyl ketone (MIBK) | 29.53 |
| 5 | Ethyl triphenyl phosphonium iodide | 0.57 |
| 6 | Bisphenol A - ethylene oxide adduct (1/6 molar ratio BPA/EtO) | 118.75 |
| 7 | Methyl isobutyl ketone | 116.25 |
| 8 | Crosslinker I[2] | 683.69 |
| 9 | Diethylene triamine - MIBK diketimine[3] | 54.16 |
| 10 | Methyl ethanol amine | 46.24 |
| | Resin Dispersion Stage | |
| 11 | Resin Synthesis Product E | 1803.63 |
| 12 | Sulfamic acid | 38.50 |
| 13 | Deionized water | 1093.72 |
| 14 | Gum rosin solution in butyl carbitol formal (30 wt %) | 15.69 |
| 15 | Deionized water | 1320.42 |

[1]EPON 828, available from Hexion Corporation.
[2]See Example 1, above.
[3]72.7% by weight (in MIBK) of the diketimine reaction product of 1 equivalent of diethylene triamine and 2 equivalents of MIBK.

A portion of the Resin Synthesis Product E (Component 11) was then poured into a pre-mixed solution of Components 12 and 13 to form a resin dispersion. Component 14 was then added quickly and the resin dispersion was stirred for 1 hour. Component 15 was then added to further dilute the resin dispersion. The free MIBK in the resin dispersion was removed from the dispersion under vacuum at a temperature of 60-70° C.

The solids content of the resulting cationic, amine-functionalized, polyepoxide-based polymeric resin dispersion, without any 1,1-di-activated vinyl compound added during the resin synthesis stage or the resin dispersion stage (Comparative Resin Dispersion E), was determined as described above in Example 3. The Comparative Resin Dispersion E had a solids content of 42.83% by weight.

Example 8: Preparation of a Cationic, Amine-Functionalized, Polyepoxide-Based Resin without any 1,1-Di-Activated Vinyl Compound in the Resin or Dispersion (Comparative Resin Dispersion F)

A cationic, amine-functionalized, polyepoxide-based polymeric resin, suitable for use in formulating electrodepositable coating compositions, was prepared in the following manner. Components 1-5 listed in Table 8, below, were mixed in a flask set up for total reflux with stirring under nitrogen. The mixture was heated to a temperature of 130° C. and allowed to exotherm (175° C. maximum). A temperature of 146° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour, resulting in Resin Synthesis Product F.

TABLE 8

| No. | Component | Parts-by-weight (grams) |
|---|---|---|
| | Resin Synthesis Stage | |
| 1 | Bisphenol A diglycidyl ether[1] | 502.19 |
| 2 | Bisphenol A | 216.85 |
| 3 | Bisphenol A - ethylene oxide adduct (1/6 molar ratio BPA/EtO) | 101.88 |
| 4 | Methyl isobutyl ketone (MIBK) | 25.40 |
| 5 | Ethyl triphenyl phosphonium iodide | 0.49 |
| 6 | Bisphenol A - ethylene oxide adduct (1/6 molar ratio BPA/EtO) | 135.62 |
| 7 | Methyl isobutyl ketone | 77.40 |
| 8 | Crosslinker II[2] | 878.94 |
| 9 | Diethylene triamine - MIBK diketimine[3] | 21.63 |
| 10 | Methyl ethanol amine | 38.98 |
| | Resin Dispersion Stage | |
| 11 | Resin Synthesis Product F | 1719.48 |
| 12 | Sulfamic acid | 30.17 |
| 13 | Deionized water | 976.73 |
| 14 | Gum rosin solution in butyl carbitol formal (30 wt %) | 14.97 |
| 15 | Butyl carbitol formal | 10.48 |
| 16 | Deionized water | 8.17 |
| 17 | Deionized water | 878.10 |

[1]EPON 828, available from Hexion Corporation.
[2]See Example 2, above.
[3]72.7% by weight (in MIBK) of the diketimine reaction product of 1 equivalent of diethylene triamine and 2 equivalents of MIBK.

A portion of the Resin Synthesis Product F (Component 11) was then poured into a pre-mixed solution of Components 12 and 13 to form a resin dispersion. Components 14-16 were then added quickly and the resin dispersion and the resin dispersion was stirred for 1 hour. Component 17 was then added to further dilute the resin dispersion. The free MIBK in the resin dispersion was removed from the dispersion under vacuum at a temperature of 60-70° C.

The solids content of the resulting cationic, amine-functionalized, polyepoxide-based polymeric resin dispersion, without any 1,1-di-activated vinyl compound added during the resin synthesis stage or the resin dispersion stage (Comparative Resin Dispersion F), was determined as described above in Example 3. The Comparative Resin Dispersion F had a solids content of 42.66% by weight.

Example 9: Preparation of a Pigmented Coating Composition Comprising a Cationic, Amine-Functionalized, Polyepoxide-Based Resin Comprising 1,1-Di-Activated Vinyl Compound (Inventive Coating Composition A)

A pigmented electrodepositable coating composition was prepared by sequentially adding the components listed in Table 9, below, to a plastic container under agitation at ambient temperature and stirring the mixture for at least 4 hours. The resulting electrodepositable coating composition had a theoretical (calculated) solids content of 10% by weight.

TABLE 9

| No. | Component | Parts-by-weight (grams) |
|---|---|---|
| 1 | Inventive Resin Dispersion A[1] | 125.23 |
| 2 | Pigment paste[2] | 18.72 |
| 3 | Deionized water | 456.09 |

[1]See Example 3, above.
[2]The pigment paste was prepared by dispersing the components listed in Table 10 with a high speed cowles blade for 30 minutes, followed by milling in a Premier Mill (NETZSCH Premier Technologies, LLC) with 1.0-1.6 mm zirconium dioxide media (Zircoa, Inc.) for one hour or until the Hegman value reached approximately 7.

TABLE 10

| No. | Component | Parts-by-weight (grams) |
|---|---|---|
| 1 | Sulfonium grind resin[1] | 450.93 |
| 2 | Surfynol GA surfactant[2] | 15.57 |
| 3 | N-butoxypropanol[3] | 4.97 |
| 4 | Lactic acid (22% by weight in deionized water) | 4.83 |
| 5 | Catalyst paste[4] | 166.54 |
| 6 | Titanium dioxide[5] | 227.12 |
| 7 | Aluminum silicate clay[6] | 190.31 |
| 8 | Carbon black[7] | 8.61 |
| 9 | Barium sulfate[8] | 15.02 |
| 10 | Deionized water | 99.72 |

[1]Prepared as described in U.S. Pat. No. 7,842,762 B2 (Example 24(a)), at column 37, lines 1-37.
[2]Available from Air Products & Chemicals.
[3]Available from Dow Chemical Co.
[4]Catalyst paste E6297AI, available from PPG Industries, Inc.
[5]Available from Tronox, Inc.
[6]Available from BASF.
[7]Available from Cabot Corporation.
[8]Available from Huntsman.

Example 10: Preparation of a Pigmented Coating Composition Comprising a Cationic, Amine-Functionalized, Polyepoxide-Based Resin Comprising 1,1-Di-Activated Vinyl Compound (Inventive Coating Composition B)

A pigmented electrodepositable coating composition was prepared by sequentially adding the components listed in Table 11, below, to a plastic container under agitation at ambient temperature and stirring the mixture for at least 4 hours. The resulting electrodepositable coating composition had a theoretical (calculated) solids content of 10% by weight.

TABLE 11

| No. | Component | Parts-by-weight (grams) |
|---|---|---|
| 1 | Inventive Resin Dispersion B[1] | 129.27 |
| 2 | Pigment paste[2] | 18.72 |
| 3 | Deionized water | 452.06 |

[1]See Example 4, above.
[2]See Example 9, above.

Example 11: Preparation of a Pigmented Coating Composition Comprising a Cationic, Amine-Functionalized, Polyepoxide-Based Resin without any 1,1-Di-Activated Vinyl Compound (Comparative Coating Composition C)

A pigmented electrodepositable coating composition was prepared by sequentially adding the components listed in Table 12, below, to a plastic container under agitation at ambient temperature and stirring the mixture for at least 4 hours. The resulting electrodepositable coating composition had a theoretical (calculated) solids content of 10% by weight.

TABLE 12

| No. | Component | Parts-by-weight (grams) |
|---|---|---|
| 1 | Comparative Resin Dispersion E[1] | 115.17 |
| 2 | Pigment paste[2] | 18.72 |
| 3 | Deionized water | 466.15 |

[1]See Example 7, above.
[2]See Example 9, above.

Example 12: Preparation of a Clearcoating Composition Comprising a Cationic, Amine-Functionalized, Polyepoxide-Based Resin Comprising 1,1-Di-Activated Vinyl Compound (Inventive Coating Composition D)

An electrodepositable clearcoating composition was prepared by sequentially adding the components listed in Table 13, below, to a plastic container under agitation at ambient temperature and stirring the mixture for at least 30 minutes. The resulting electrodepositable coating composition had a theoretical (calculated) solids content of 10% by weight.

TABLE 13

| No. | Component | Parts-by-weight (grams) |
|---|---|---|
| 1 | Inventive Resin Dispersion A[1] | 126.94 |
| 2 | Dibutyl tin oxide paste[2] | 2.33 |
| 3 | Deionized water | 370.73 |

[1]See Example 3, above.
[2]Dibutyl tin oxide paste E6165, available from PPG Industries, Inc.

Example 13: Preparation of a Clearcoating Composition Comprising a Cationic, Amine-Functionalized, Polyepoxide-Based Resin without any 1,1-Di-Activated Vinyl Compound (Comparative Coating Composition E)

An electrodepositable clearcoating composition was prepared by sequentially adding the components listed in Table 14, below, to a plastic container under agitation at ambient temperature and stirring the mixture for at least 30 minutes. The resulting electrodepositable coating composition had a theoretical (calculated) solids content of 10% by weight.

TABLE 14

| No. | Component | Parts-by-weight (grams) |
|---|---|---|
| 1 | Comparative Resin Dispersion E[1] | 116.74 |
| 2 | Dibutyl tin oxide paste[2] | 2.33 |
| 3 | Deionized water | 380.93 |

[1]See Example 7, above.
[2]Dibutyl tin oxide paste E6165, available from PPG Industries, Inc.

Example 14: Preparation of a Clearcoating Composition Comprising a Cationic, Amine-Functionalized, Polyepoxide-Based Resin Comprising 1,1-Di-Activated Vinyl Compound (Inventive Coating Composition F)

An electrodepositable clearcoating composition was prepared by sequentially adding the components listed in Table 15, below, to a plastic container under agitation at ambient temperature and stirring the mixture for at least 30 minutes. The resulting electrodepositable coating composition had a theoretical (calculated) solids content of 10% by weight.

TABLE 15

| No. | Component | Parts-by-weight (grams) |
|---|---|---|
| 1 | Inventive Resin Dispersion C[1] | 117.37 |
| 2 | Dibutyl tin oxide paste[2] | 2.33 |
| 3 | Deionized water | 380.30 |

[1]See Example 5, above.
[2]Dibutyl tin oxide paste E6165, available from PPG Industries, Inc.

Example 15: Preparation of a Clearcoating Composition Comprising a Cationic, Amine-Functionalized, Polyepoxide-Based Resin Comprising 1,1-Di-Activated Vinyl Compound (Inventive Coating Composition G)

An electrodepositable clearcoating composition was prepared by sequentially adding the components listed in Table 16, below, to a plastic container under agitation at ambient temperature and stirring the mixture for at least 30 minutes. The resulting electrodepositable coating composition had a theoretical (calculated) solids content of 10% by weight.

TABLE 16

| No. | Component | Parts-by-weight (grams) |
|---|---|---|
| 1 | Inventive Resin Dispersion D[1] | 108.86 |
| 2 | Dibutyl tin oxide paste[2] | 2.33 |
| 3 | Deionized water | 388.81 |

[1]See Example 6, above.
[2]Dibutyl tin oxide paste E6165, available from PPG Industries, Inc.

Example 16: Preparation of a Clearcoating Composition Comprising 1,1-Di-Activated Vinyl Compound and a Cationic, Amine-Functionalized, Polyepoxide-Based Resin (Inventive Coating Composition H)

An electrodepositable clearcoating composition was prepared in the following manner. Component 1 listed in Table 17, below, was added to a plastic container at ambient temperature and Component 2 was added dropwise under agitation. Component 3 was then added and the mixture was stirred for at least 4 hours. Component 4 was then added and the mixture was stirred for at least 30 more minutes. The resulting electrodepositable coating composition had a theoretical (calculated) solids content of 10% by weight.

TABLE 17

| No. | Component | Parts-by-weight (grams) |
|---|---|---|
| 1 | Comparative Resin Dispersion F[1] | 117.21 |
| 2 | Diethyl methylene malonate (DEMM) | 2.50 |
| 3 | Deionized water | 402.85 |
| 4 | Dibutyl tin oxide paste[2] | 2.45 |

[1]See Example 8, above.
[2]Dibutyl tin oxide paste E6165, available from PPG Industries, Inc.

Example 17: Preparation of a Clearcoating Composition Comprising a Cationic, Amine-Functionalized, Polyepoxide-Based Resin without any 1,1-Di-Activated Vinyl Compound (Comparative Coating Composition I)

A pigmented electrodepositable coating composition was prepared by sequentially adding the components listed in Table 18, below, to a plastic container under agitation at ambient temperature and stirring the mixture for at least 30 minutes. The resulting electrodepositable coating composition had a theoretical (calculated) solids content of 10% by weight.

TABLE 18

| No. | Component | Parts-by-weight (grams) |
|---|---|---|
| 1 | Comparative Resin Dispersion F[1] | 117.21 |
| 2 | Dibutyl tin oxide paste[2] | 2.33 |
| 3 | Deionized water | 380.46 |

[1]See Example 8, above.
[2]Dibutyl tin oxide paste E6165, available from PPG Industries, Inc.

Example 18: Oil Spot Contamination (Cratering) Resistance Testing

Inventive and Comparative Coating Compositions A-I (see Examples 9-17, above) were electrodeposited onto 3-inch by 6-inch by 0.031-inch cold-rolled steel substrate panels pretreated with CHEMFOS C700 followed by a deionized water rinse and forced air drying (CHEMFOS C700 is a zinc phosphate immersion pretreatment composition available from PPG Industries, Inc., and the substrate panels are available in pretreated form from ACT Test Panels LLC). The substrate panels were electrocoated by immersing each panel into a stirring bath containing the coating composition and maintained at 32° C. The cathode of a direct current (DC) rectifier was connected to each panel and the anode of the rectifier was connected to stainless steel tubing used to circulate cooling water for the bath temperature control. The DC rectifier voltage was increased from 0 to a setpoint of 200 volts over a period of 30 seconds and then held at 200 volts for an additional 120 seconds, during which time the cationic coating resins precipitated from the dispersions in the baths, and deposited onto and formed coating layers over the surfaces of the substrate panels. After the electrodeposition of the coating layers, the panels were removed from the bath and rinsed vigorously with a spray of deionized water, dried under ambient conditions, and cured by baking for 20 minutes at 177° C. in an electric oven.

The substrate panels comprising the electrodeposited coating layers were tested for oil spot contamination resistance, which evaluates the ability of an electrodeposited coating to resist crater formation upon cure. The electrodeposited coating layers were tested for oil spot crater resistance by localized contamination of the dried coating layers using LubeCon Series O Lubricant, an oil commonly used for chain lubrication in automobile assembly plants, and available from Castrol Industrial North America Inc. The oil was deposited as a droplet (<0.1 µL) onto the dried coating layers using a 40% by weight solution of the LubeCon Series O Lubricant in isopropanol and a micropipette (Scilogex). The oil-spotted substrate panels were then cured as described above (baked for 20 minutes at 177° C. in an electric oven).

Each substrate panel was scanned using a Mitutoyo SJ-402 stylus profilometer to examine the depth of crater defects in the cured coating layer. The scan length, rate, sampling interval, and tip diameter were 48 mm, 1 mm/s, 5 µm, and 5 µm, respectively. The differences between the highest peak and lowest pit points of each of the resulting craters in each coating layer (crater depth, Δ) were averaged (at least 4 craters per coating layer) to quantify the results of the oil spot test. The results are summarized in Table 19, below.

TABLE 19

| Coating Composition | 1,1-di-activated vinyl compound | Addition Stage | Crater Size (Δ, µm) |
|---|---|---|---|
| Pigmented Coating Compositions Containing Crosslinker I | | | |
| A | DEMM | Synthesis | 5.2 |
| B | D3M | Synthesis | 9.7 |
| C* | None | — | 16.7 |
| Clearcoating Compositions Containing Crosslinker I | | | |
| D | DEMM | Synthesis | 7.6 |
| E* | None | — | 17.8 |
| Clearcoating Composition Containing Crosslinker II | | | |
| F | DEMM + DEMM-hexanediol adduct | Synthesis | 9.4 |
| G | DEMM | Dispersion | 18.2 |
| H | DEMM | Formulation | 11.0 |
| I* | None | — | 27.6 |

*Comparative Examples.

The addition of 1,1-di-activated vinyl compounds to the resin at the synthesis stage resulted in significantly improved oil spot contamination resistance as demonstrated by the reduced crater depth in clear and pigmented coatings. Improvements in oil spot contamination resistance were also observed when 1,1-di-activated vinyl compounds were added during the resin dispersion stage and when formulating coating compositions. These results were surprising and unexpected.

ASPECTS OF THE INVENTION

Aspects of the invention include, but are not limited to, the following numbered clauses.
1. A electrodepositable coating composition comprising:
   (A) a polymer comprising (1) a reactive functional group and/or (2) a salt group or a salt-forming group; and
   (B) at least one component comprising:

(b1) a 1,1-di-activated vinyl compound, or a multifunctional form thereof, or a combination thereof;

(b2) a polymerization reaction product of a 1,1-di-activated vinyl compound, or a multifunctional form thereof, or a combination thereof; and/or (b3) an addition reaction product of (1) the polymer component (A) and (2) a 1,1-di-activated vinyl compound, or a multifunctional form thereof, or a combination thereof.

2. The coating composition of clause 1 wherein the composition is water dispersible.

3. The coating composition of clause 1, wherein the polymer component (A) comprises (1) an active hydrogen functional group and (2) a cationic salt group or an anionic salt group.

4. The coating composition of clause 1-3, comprising 0.1-30 percent by weight of component (b1) and/or (b2), based on total weight of resin solids in the coating composition.

5. The coating composition of any one of clauses 1-4, comprising 1-15 percent by weight of component (b1) and/or (b2), based on total weight of resin solids in the coating composition.

6. The coating composition of any one of clauses 1-5, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

7. The coating composition of any one of clauses 1-6, wherein the 1,1-di-activated vinyl compound comprises:
   a dialkyl methylene malonate;
   a multifunctional form of a dialkyl methylene malonate;
   a diaryl methylene malonate; or
   a multifunctional form of a diaryl methylene malonate; or
   a combination of any thereof.

8. The coating composition of any one of clauses 1-7, wherein the 1,1-di-activated vinyl compound comprises:
   dimethyl methylene malonate; and/or
   a multifunctional form of dimethyl methylene malonate comprising a transesterification adduct of dimethyl methylene malonate and at least one polyol.

9. The coating composition of any one of clauses 1-8, wherein the 1,1-di-activated vinyl compound comprises:
   diethyl methylene malonate; and/or
   a multifunctional form of diethyl methylene malonate comprising a transesterification adduct of diethyl methylene malonate and at least one polyol.

10. The coating composition of any one of clauses 1-9, wherein the 1,1-di-activated vinyl compound comprises a transesterification adduct of diethyl methylene malonate and at least one diol.

11. The coating composition of clause 10, wherein the diol comprises an alkane diol.

12. The coating composition of clause 11, wherein the alkane diol comprises 1,5-pentane diol and/or 1,6-hexanediol.

13. The coating composition of any one of clauses 1-12, wherein the component (B) comprises the polymerization reaction product (b2) of reactants comprising:
   a dialkyl methylene malonate; and/or
   a multifunctional form of the dialkyl methylene malonate comprising a transesterification adduct of the dialkyl methylene malonate and at least one polyol.

14. The coating composition of any one of clauses 1-13, wherein the component (B) comprises the addition reaction product (b3) of reactants comprising:

(i) the polymer component (A) comprising (1) an active hydrogen functional group and (2) a cationic salt group or an anionic salt group; and (ii) a dialkyl methylene malonate and/or a multifunctional form of the dialkyl methylene malonate comprising a transesterification adduct of the dialkyl methylene malonate and at least one polyol.

15. The coating composition of any one of clauses 1-14, wherein the polymer component (A) comprises an amine-functional polyepoxide polymer, an amine-functional polyacrylate polymer, an amine-functional polyurethane and/or polyurea polymer, an amine-functional polyester polymer, an amine-functional polyether polymer, an acid-functional polyepoxide polymer, an acid-functional polyacrylate polymer, an acid-functional polyurethane and/or polyurea polymer, an acid-functional polyester polymer, an acid-functional polyether polymer, a sulfonium-functional polyepoxide polymer, a sulfonium-functional polyacrylate polymer, a sulfonium-functional polyurethane and/or polyurea polymer, a sulfonium-functional polyester polymer, or a sulfonium-functional polyether polymer, or a combination of any thereof.

16. The coating composition of any one of clauses 1-15, wherein the polymer component (A) comprises a polyepoxide-amine adduct.

17. An article comprising a coating layer deposited over a surface of the article, wherein the coating layer comprises the coating composition of any one of clauses 1-16.

18. The article of clause 17, wherein the article comprises a vehicle component or a free-standing structure.

19. A process for the production of a coating composition comprising:
   reacting (A) a polymer comprising a reactive functional group and (B) a 1,1-di-activated vinyl compound, or a multifunctional form thereof, or a combination thereof, to form a resin product;
   treating the resin product to form ionic salt groups on the polymer; and
   dispersing the resin product in water.

20. The process of clause 19, wherein:
   the reacting step comprises reacting (A) a polymer comprising an active hydrogen group and (B) a 1,1-di-activated vinyl compound, or a multifunctional form thereof, or a combination thereof, to form a resin product; and
   the treating step comprises treating the resin product with an acid to form cationic salt groups on the polymer.

21. The process of clause 19, wherein the resin product comprises a polymerization reaction product of component (B).

22. The process of clause 19, wherein the component (B) is reacted during the synthesis of component (A).

23. The process of clause 19, wherein the component (B) is reacted during the dispersion of the resin product.

24. The process of any one of clauses 19-21, wherein the resin product comprises an addition reaction product of components (A) and (B).

25. The process of clause 19, wherein the component (B) is reacted during the formulation of a an electrodepositable coating composition comprising:
   (A) a polymer comprising (1) a reactive functional group and/or (2) a salt group or a salt-forming group; and
   (B) at least one component comprising:
      (b1) a 1,1-di-activated vinyl compound, or a multifunctional form thereof, or a combination thereof;
      (b2) a polymerization reaction product of a 1,1-di-activated vinyl compound, or a multifunctional form thereof, or a combination thereof; and/or (b3) an addition reaction product of (1) the polymer component (A) and (2) a 1,1-di-activated vinyl compound, or a multifunctional form thereof, or a combination thereof.

26. The process of any one of clauses 19-22, wherein component (B) comprises a 1,1-di-activated vinyl compound comprising dimethyl methylene malonate and/or diethyl methylene malonate.

27. The process of any one of clauses 19-23, wherein component (B) comprises:
    diethyl methylene malonate; and/or
    a multifunctional form of diethyl methylene malonate comprising a transesterification adduct of diethyl methylene malonate and at least one polyol.

28. The process of any one of clauses 19-24, wherein the polymer (A) comprises an active hydrogen group-containing polymer comprising a polyepoxide-amine adduct.

29. A process for the production of a coating composition comprising:
    synthesizing a polymer comprising (i) a reactive functional group and/or (ii) a cationic salt group or an anionic salt group;
    dispersing the polymer in water to form a dispersion; and
    adding a 1,1-di-activated vinyl compound, or a multifunctional form thereof, or a combination thereof to the dispersion.

30. A process for the production of a coating composition comprising:
    synthesizing a polymer comprising (i) an active hydrogen group and/or (ii) a functional group that is capable of being neutralized;
    reacting the polymer with an acid or a base to form a cationic salt group or an anionic salt group;
    dispersing the polymer in water to form a dispersion; and
    adding a 1,1-di-activated vinyl compound, or a multifunctional form thereof, or a combination thereof to the dispersion 31. The process of clause 26, wherein the process comprises:
    synthesizing a polymer comprising (i) an active hydrogen group and (ii) a cationic salt group or an anionic salt group;
    dispersing the polymer in water to form a dispersion; and
    adding a 1,1-di-activated vinyl compound, or a multifunctional form thereof, or a combination thereof to the dispersion.

32. The process of clauses 29-31, wherein the 1,1-di-activated vinyl compound, or multifunctional form thereof, or combination thereof is added to the dispersion in an amount of 0.1-30 percent by weight, based on total weight of resin solids in the dispersion.

33. The process of any one of clauses 29-32, wherein the 1,1-di-activated vinyl compound, or multifunctional form thereof, or combination thereof is added to the dispersion in an amount of 1-15 percent by weight, based on total weight of resin solids in the dispersion.

34. The process of any one of clauses 29-33, wherein the 1,1-di-activated vinyl compound, or multifunctional form thereof, or combination thereof polymerizes in the dispersion.

35. The process of any one of clauses 29-34, wherein the 1,1-di-activated vinyl compound, or multifunctional form thereof, or combination thereof, reacts with functional groups on or in the polymer to form pendant and/or terminal groups derived from the addition of the 1,1-di-activated vinyl compound, or multifunctional form thereof, or combination thereof.

36. The process of any one of clauses 29-35, wherein the 1,1-di-activated vinyl compound, or multifunctional form thereof, or combination thereof, reacts with pendant and/or terminal active hydrogen groups on the polymer to form pendant and/or terminal groups derived from the addition of the 1,1-di-activated vinyl compound, or multifunctional form thereof, or combination thereof.

37. The process of any one of clauses 29-36, wherein the 1,1-di-activated vinyl compound, or multifunctional form thereof, or combination thereof, reacts with in-chain functional groups in the polymer to form pendant groups derived from the addition of the 1,1-di-activated vinyl compound, or multifunctional form thereof, or combination thereof.

38. The process of any one of clauses 29-37, wherein the 1,1-di-activated vinyl compound comprises dimethyl methylene malonate and/or diethyl methylene malonate.

39. The process of any one of clauses 29-38, wherein the 1,1-di-activated vinyl compound comprises:
    diethyl methylene malonate; and/or
    a multifunctional form of diethyl methylene malonate comprising a transesterification adduct of diethyl methylene malonate and at least one polyol.

40. The process of any one of clauses 29-39, wherein the polymer comprises a polyepoxide-amine adduct.

41. The coating composition of any one clauses 1-16, the article of clause 17 or clause 18, or the process of any one of clauses 19-40, wherein the coating composition comprises an electrodepositable coating composition.

42. A substrate coated with the coating composition of clause 1

43. A substrate of clause 42, wherein the substrate is metallic and/or non-metallic 44. A substrate of clause of 43, wherein the non-metallic substrate is a polymer.

45. An article of clause 18 wherein the free-standing article is an industrial component, a building, a bridge, a package, sports equipment, an appliance, sports equipment, glass, wood, a device or a piece of furniture.

46. An article in clause 18 wherein the mobile entity is an automobile, airplane, helicopter, train, ship, boat or submersible and/or components of the same 47. Use of a 1,1-di-activated vinyl compound, or a multifunctional form thereof, or a combination thereof as described in any of clauses 6-12 or a polymerization reaction product thereof as described in clause 13 or clause 14 to improve oil spot contamination resistance and/or cratering resistance in electrodeposited coatings, wherein oil spot contamination resistance and/or cratering resistance are improved in comparison to a coating electrodeposited from the same composition not comprising any of the 1,1-di-activated vinyl compound, multifunctional form or other reaction product thereof.

48. A process for the production of an electrodepositable coating compositions, comprising:
    incorporating a 1,1-di-activated vinyl compound or a reaction product thereof into the coating composition during production.

Various features and characteristics are described in this specification to provide an understanding of the composition, structure, production, function, and/or operation of the invention, which includes the disclosed compositions, systems, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and can possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. An electrodepositable coating composition comprising:
   (A) a polymer comprising (1) a reactive functional group and/or (2) a salt group or a salt-forming group; and
   (B) at least one component comprising:
      (b1) a 1,1-di-activated vinyl compound, or a multifunctional form thereof, or a combination thereof;
      (b2) a polymerization reaction product of a 1,1-di-activated vinyl compound, or a multifunctional form thereof, or a combination thereof; and/or
      (b3) an addition reaction product of (1) the polymer component (A) and (2) a 1,1-di-activated vinyl compound, or a multifunctional form thereof, or a combination thereof,
   wherein the 1,1-di-activated vinyl compound comprises a methylene dicarbonyl compound.

2. The coating composition of claim 1, wherein the polymer component (A) comprises (1) an active hydrogen functional group and (2) a cationic salt group or an anionic salt group.

3. The coating composition of claim 1, comprising 0.1-30 percent by weight of component (b1) and/or (b2), based on total weight of resin solids in the coating composition.

4. The coating composition of claim 1, wherein the 1,1-di-activated vinyl compound comprises:
   a dialkyl methylene malonate;
   a multifunctional form of a dialkyl methylene malonate;
   a diaryl methylene malonate; or
   a multifunctional form of a diaryl methylene malonate; or
   a combination of any thereof.

5. The coating composition of claim 4, wherein the 1,1-di-activated vinyl compound comprises:
dimethyl methylene malonate; and/or
a multifunctional form of dimethyl methylene malonate comprising a transesterification adduct of dimethyl methylene malonate and at least one polyol.

6. The coating composition of claim 4, wherein the 1,1-di-activated vinyl compound comprises:
diethyl methylene malonate; and/or
a multifunctional form of diethyl methylene malonate comprising a transesterification adduct of diethyl methylene malonate and at least one polyol.

7. The coating composition of claim 1, wherein the component (B) comprises the polymerization reaction product (b2) of reactants comprising:
a dialkyl methylene malonate; and/or
a multifunctional form of the dialkyl methylene malonate comprising a transesterification adduct of the dialkyl methylene malonate and at least one polyol.

8. The coating composition of claim 1, wherein the component (B) comprises the addition reaction product (b3) of reactants comprising:
(i) the polymer component (A) comprising (1) an active hydrogen functional group and (2) a cationic salt group or an anionic salt group; and
(ii) a dialkyl methylene malonate and/or a multifunctional form of the dialkyl methylene malonate comprising a transesterification adduct of the dialkyl methylene malonate and at least one polyol.

9. An article comprising a coating layer deposited over a surface of the article, wherein the coating layer comprises the coating composition of claim 1.

10. A process for the production of the electrodepositable coating composition of claim 1 comprising:
reacting the polymer (A) and the component (B), to form a resin product;
treating the resin product with an acid to form cationic salt groups or base to form anionic salt groups on the polymer; and
dispersing the resin product in water.

11. The process of claim 10, wherein:
the treating step comprises treating the resin product with an acid to form cationic salt groups on the polymer.

12. The process of claim 1, wherein the resin product comprises an addition reaction product of components (A) and (B).

13. The process of claim 10, wherein the component (B) is reacted during the formulation of an electrodepositable coating composition comprising:
the polymer (A); and
the component (B).

14. The process of claim 10, wherein component (B) comprises:
diethyl methylene malonate; and/or
a multifunctional form of diethyl methylene malonate comprising a transesterification adduct of diethyl methylene malonate and at least one polyol.

15. A process for the production of the electrodepositable coating composition of claim 1 comprising:
synthesizing the polymer (A);
dispersing the polymer (A) in water to form a dispersion; and
adding the component (B) to the dispersion.

16. The process of claim 15, wherein the process comprises:
synthesizing the polymer (A);
dispersing the polymer (A) in water to form a dispersion; and
adding the component (B) to the dispersion.

17. A process for the production of the electrodepositable coating composition of claim 1 comprising:
synthesizing the polymer (A);
reacting the polymer (A) with an acid or a base to form a cationic salt group or an anionic salt group;
dispersing the polymer (A) in water to form a dispersion; and
adding the component (B) to the dispersion.

18. The process of claim 17, wherein the process comprises:
synthesizing the polymer (A);
dispersing the polymer (A) in water to form a dispersion; and
adding the component (B) to the dispersion.

19. A substrate coated with the coating composition of claim 1.

20. The substrate of claim 19, wherein the substrate is metallic and/or non-metallic.

* * * * *